May 26, 1925.

R. M. LOVEJOY 1,539,321

SPRING CLAMPING DEVICE AND THE LIKE

Original Filed July 2, 1920

Inventor—
Ralph M. Lovejoy.
By—Heard Smith & Tennant.
Attorneys.

Patented May 26, 1925.

1,539,321

UNITED STATES PATENT OFFICE.

RALPH M. LOVEJOY, OF BOSTON, MASSACHUSETTS.

SPRING-CLAMPING DEVICE AND THE LIKE.

Original application filed July 2, 1920, Serial No. 393,536. Divided and this application filed November 9, 1922. Serial No. 599,810.

*To all whom it may concern:*

Be it known that I, RALPH M. LOVEJOY, a citizen of the United States, and resident of Boston, county of Suffolk, State of Massachusetts, have invented an Improvement in Spring-Clamping Devices and the like, of which the following description, in connection with the accompanying drawing, is a specification, like characters on the drawing representing like parts.

This invention relates to improvements in mechanism for clamping together a series of superimposed devices of equal width such as the leaves of leaf springs. More particularly the invention comprises means for clamping the leaves of a built-up leaf spring to a suitable support in which the clamping means is so constructed as to prevent lateral displacement of the leaves.

A further feature of the invention consists in providing means for clamping a built-up leaf spring having layers of anti-friction material interposed between successive leaves in which the clamping means will not only prevent lateral displacement of the leaves but will also prevent lateral displacement or spreading of the anti-friction material.

Other objects and features of the invention more fully appear from the following description and accompanying drawings and will be pointed out in the claims.

Preferred embodiments of the invention are illustrated in the accompanying drawing.

The invention is disclosed herein as illustrating various means by which the invention may be employed for securing a built-up spring, such as that of an automobile to its seat and also acting to prevent lateral movement or displacement of the spring leaves.

Figure 1:
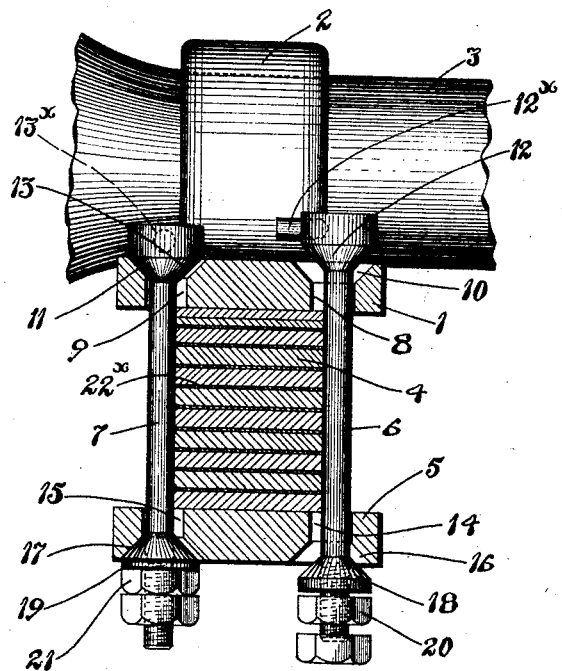
Fig. 1 is a view partially in vertical section of a leaf spring built up of a series of superimposed leaves having means for clamping the same to the axle of a vehicle.

As illustrated in Fig. 1 a spring seat member is secured to the cylindrical axle of a vehicle. In this construction the spring seat comprises a base 1 having integral therewith an upwardly extending strap or loop 2 which fits upon and is secured to the axle 3. The spring 4 is clamped against the base 1 by a clamping plate 5 by means of pairs of bolts 6 and 7 arranged on opposite sides of the spring leaves.

The base 1 is provided with pairs of bolt holes 8 and 9 which are of larger diameter than the bolts 6 and 7 respectively and countersinks 10 and 11 are provided in the upper surface of the base 1 to communicate with the bolt holes 8 and 9 respectively. The bolts 6 and 7 are provided respectively with heads having conical portions 12 and 13 adapted to seat in the conical countersinks 10 and 11. The conical bolt heads desirably are provided with means for preventing rotation of the bolt when the nuts are set up or unscrewed, such, for example, as pins 12<sup>x</sup> and 13<sup>x</sup> adapted to be engaged by an abutment or by a suitable tool.

The holes 8 and 9 and their countersinks are so bored that their inner margins overlap the edges of the spring leaves so that when the bolts are set up the conical portions 12 and 13 engaging respectively the walls of the countersinks 10 and 11 tend to draw the bolts toward the springs so that their stems are forced tightly against the edges of the spring.

The clamping plate 5 also is provided with bolt holes 14 and 15 provided with countersinks 16 and 17 and the bolts are provided with washers 18 and 19 having conical portions complementary to the countersinks 16 and 17 respectively. The bolt holes 14 and 15 like the bolt holes 8 and 9 are so spaced that their inner margins overlie the edges of the spring, so that when the washers are forced into place and by the usual set nuts 20, 21, the lower ends of the bolts are forced towards each other. By reason of this construction the pairs of bolts on opposite sides of the spring are forced against the edges of the spring and serve to prevent any lateral displacement of the spring leaves. Any wear which may occur may also be compensated for by setting up the nuts 20, 21, sufficiently to clamp the springs properly in place. In the present construction the spring 4 is illustrated as comprising a series of spring leaves with layers 22ˣ of antifriction material therebetween. Such anti-friction material being oil soaked wood, brake lining provided with a suitable lubricant such as oil or graphite, or any other suitable material.

Figure 2:
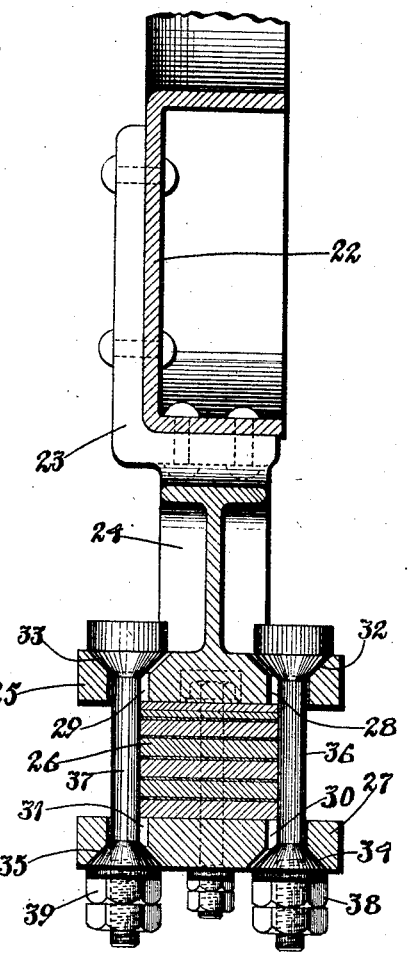
Fig. 2 is a view mainly in vertical section illustrating the invention as employed in clamping a built-up leaf spring to a bracket on the frame of a vehicle such as an automobile, and, Fig. 3 is a side elevation of a different form of clamping device embodying the invention for securing the leaf spring to the axle of a vehicle.

In Fig. 2 a similar construction is illustrated as applied to the anchorage of a spring to the frame of an automobile, such anchorage being that commonly used in the cantilever type of spring. As illustrated herein the automobile frame comprises a channel bar 22. of usual construction to which a bracket 23 is riveted, the bracket having an offset downwardly extending portion 24 which underlies the frame and is provided at its lower end with a preferably integral base 25 providing a spring seat. The spring 26 is clamped against this seat by a clamping plate 27 and the base 25 and clamping plate 27 are provided with bolt holes 28, 29 and 30, 31 respectively the inner edges of which overlap the springs in the manner above described. The base 25 is provided with countersinks 32, 33 communicating with the bolt holes 28, 29 and the clamping plate is provided with countersinks 34, 35 communicating respectively with the bolt holes 30, 31. The bolts 36 and 37 are provided with conical heads and conical washers complementary to the countersinks so that when the bolts are set up by the nuts 38 and 39 the stems of the bolts will be forced against the edges of the spring leaves in the manner heretofore described.

Figure 3:
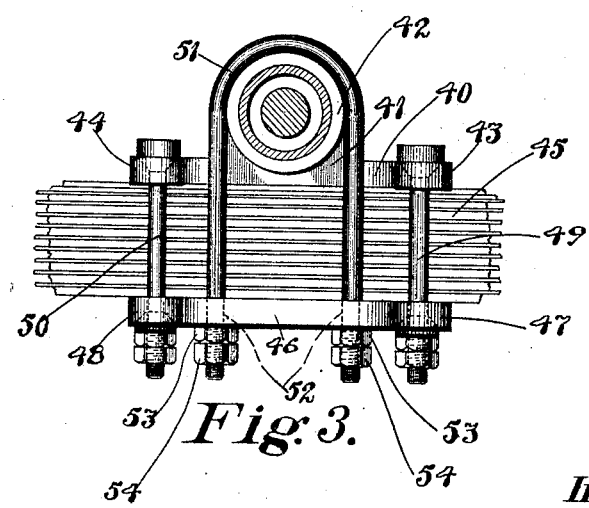

In Fig. 3 a modified construction is illustrated for securing the spring to the rear axle of the vehicle. In this construction a spring seat 40 is provided which desirably is substantially the same width as the spring, the central portion of the spring seat being provided with an upwardly extending hollow boss 41 to receive the axle housing 42. The spring seat 40 is provided with pairs of laterally extending ears 43—44 which are provided with bolt holes having countersinks of the character above described and spaced apart a less distance than the width of the spring. The spring 45 is clamped upon its seat by a clamping plate 46 having laterally extending ears 47, 48 similar to the ears 43, 44, these ears likewise being provided with bolt holes having countersinks and spaced similarly to those of the seat 40. The clamping bolts 49, 50, having conical heads and conical washers similar to those above described, serve to clamp the plate 46 against the seat 40 and also act when drawn up to force the bolts against the edges of the spring in the manner above described. In this construction the spring is secured to the seat by U bolts 51 which embrace the axle housing and extend through suitable bolt holes 52 in the clamping plate 46 and are provided with usual nuts 53 and lock nuts 54.

It will be understood that the embodiments of the invention disclosed herein are of an illustrative character and not restricted and that various other means may be provided for clamping the spring upon its spring seat in which means are provided for causing the clamping means to engage the edges of the spring leaves in such a manner as to prevent their lateral movement or displacement. It will also be understood that the invention in its broad aspect includes any means by which a series of superimposed articles may be clamped together and in which the clamping means is caused during its clamping action of engaging the edges of the superimposed articles to prevent them from lateral movement and displacement.

This application is a division of my prior application for patent upon improvements in spring constructions for vehicles, Serial Number 393,536, filed July 2, 1920.

Having thus described my invention, what I claim as new, and desire to secure by Letters Patent, is:

1. Mechanism for clamping together a series of superimposed devices of equal width comprising a base and a co-operating clamping member, separate means located on opposite sides of said superimposed devices connecting said clamping member to said base operable to force said clamping member toward said base and simultaneously to be forced bodily laterally against the edges of the superimposed devices.

2. Mechanism for clamping together a series of superimposed devices of equal width comprising a base and a co-operating clamping member adapted respectively to engage the outer faces of said superimposed devices and each provided with apertures the inner margins of which are spaced a less distance apart than the width of said devices and with inwardly inclined outer walls, bolts extending through said apertures having heads provided with inclined outer walls and washers with inclined outer walls complementary to the walls of the respective apertures operable upon setting up of the nuts of said bolts to force the shanks of the bolts firmly against the edges of the superimposed devices.

3. In a spring construction for vehicles having a superimposed series of spring leaves, spring-supporting means comprising a spring seat and a co-operating clamping member, engaging respectively the upper and lower surfaces of the superimposed leaves, separate bolts located on opposite sides of said spring leaves connecting said clamping member and seat operable to force said clamping member toward said seat and means including co-operating inclined surfaces upon said bolts and complementary inclined surfaces upon said clamping member and seat respectively acting simultaneously to cause said bolts positively to engage the edges of the spring leaves to force the respective leaf edges into alinement.

4. A spring construction for vehicles having a series of superimposed spring leaves, spring-supporting means comprising a spring seat and a co-operating clamping member each provided with apertures the inner margins of which are spaced a less distance apart than the width of the spring leaves and provided with conical countersinks, bolts connecting said clamping means provided with conical heads and washers complementary to said countersinks and clamping nuts for said bolts operable to force said conical heads and washers into said countersinks and thereby to force the stems of the bolts into engagement with the edges of the spring leaves.

5. In a spring construction for vehicles, a superimposed series of spring leaves, layers of anti-friction material between adjacent leaves of substantially equal width to that of the spring leaves, a spring seat and a co-operating clamping member each provided with apertures the inner margins of which are spaced a less distance apart than the width of the spring and provided with conical countersinks, bolts connecting said clamping members having means engaging said countersinks operable, upon the setting up of the nuts of the bolts, to force the stems of the bolts against the edges of said spring leaves and the layers of anti-friction material.

In testimony whereof, I have signed my name to this specification.

RALPH M. LOVEJOY.